United States Patent
Takagi (10) Patent No.: US 11,312,024 B2
(45) Date of Patent: Apr. 26, 2022

(54) ASSEMBLY APPARATUS HAVING POSITIONAL SHIFT CORRECTION OF COMPONENTS

(71) Applicant: KYOCERA Document Solutions Inc., Osaka (JP)

(72) Inventor: Masaru Takagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 114 days.

(21) Appl. No.: 16/880,055

(22) Filed: May 21, 2020

(65) Prior Publication Data

US 2020/0376682 A1 Dec. 3, 2020

(30) Foreign Application Priority Data

May 31, 2019 (JP) .............................. JP2019-102595

(51) Int. Cl.
*B25J 15/04* (2006.01)
*B25J 15/08* (2006.01)

(52) U.S. Cl.
CPC ........... *B25J 15/0433* (2013.01); *B25J 15/08* (2013.01)

(58) Field of Classification Search
CPC .... B25J 15/0433; B25J 15/08; B25J 15/0408; B25J 15/0019; B25J 9/1687
USPC ....................................................... 294/106
See application file for complete search history.

(56) References Cited

U.S. PATENT DOCUMENTS

| 4,314,383 | A | * | 2/1982 | Epstein | ..................... B25B 9/02 269/6 |
| 4,676,541 | A | * | 6/1987 | Lord | .................... B25J 15/0475 294/119.1 |
| 5,256,128 | A | * | 10/1993 | Neumann | ............. B23Q 1/0063 294/86.4 |
| 10,179,412 | B2 | * | 1/2019 | Yamane | ............... B25J 15/0033 |

(Continued)

FOREIGN PATENT DOCUMENTS

| DE | 20 2014 005 583 U1 | 9/2014 |
| GB | 2 068 891 A | 8/1981 |
| JP | H07185959 A | 7/1995 |

OTHER PUBLICATIONS

The extended European search report issued by the European Patent Office dated Aug. 19, 2020, which corresponds to European Patent Application No. 20176030.3-1016 and is related to U.S. Appl. No. 16/880,055.

*Primary Examiner* — Paul T Chin (74) *Attorney, Agent, or Firm* — Studebaker & Brackett PC (57) ABSTRACT

An assembly apparatus assembles a first component and a second component. The assembly apparatus includes a gripping section, a correcting section, and a driving section. The gripping section grips the first component. The correcting section corrects positional shift of the first component relative to the second component. The driving section drives the correcting section. The correcting section includes a first mechanism connected to the gripping section and a second mechanism connected to the driving section. The first mechanism has a first tapered portion on a surface opposite to the gripping section. The second mechanism has a second tapered portion on a surface opposite to the driving section. The second tapered portion has a substantially identical (Continued)

shape to the first tapered portion. The first tapered portion is placed on the second tapered portion.

4 Claims, 10 Drawing Sheets

(56) References Cited

U.S. PATENT DOCUMENTS

| | | | |
|---|---|---|---|
| 2015/0251321 A1* | 9/2015 | Ishikawa | B25J 15/0047 |
| | | | 294/183 |
| 2018/0141215 A1* | 5/2018 | Yamane | B25J 19/0033 |
| 2020/0122322 A1* | 4/2020 | Mori | B23P 19/02 |
| 2020/0269442 A1* | 8/2020 | Izumi | B25J 9/1055 |

* cited by examiner

ASSEMBLY APPARATUS HAVING POSITIONAL SHIFT CORRECTION OF COMPONENTS

INCORPORATION BY REFERENCE

The present application claims priority under 35 U.S.C. § 119 to Japanese Patent Application No. 2019-102595, filed on May 31, 2019. The contents of this application are incorporated herein by reference in their entirety.

BACKGROUND

The present disclosure relates to an assembly apparatus.

A known positional correction technique uses a chamfered portion of a workpiece.

A known assembly apparatus grips a first component, detects using a sensor reaction force occurring from the chamfered portion of a second component when the first component is fitted to the second component, and corrects positional shift of the first component according to the direction of the reaction force.

SUMMARY

An assembly apparatus according to an aspect of the present disclosure assembles a first component and a second component. The assembly apparatus includes a gripping section, a correcting section, and a driving section. The gripping section grips the first component. The correcting section corrects positional shift of the first component relative to the second component. The driving section drives the correcting section. The correcting section includes a first mechanism connected to the gripping section and a second mechanism connected to the driving section. The first mechanism has a first tapered portion on a surface opposite to the gripping section. The second mechanism has a second tapered portion on a surface opposite to the driving section. The second tapered portion has a substantially identical shape to the first tapered portion. The first tapered portion is placed on the second tapered portion.

DETAILED DESCRIPTION

The following describes an embodiment of the present disclosure with reference to FIGS. 1 to 10. In FIGS. 1 to 10, as a matter of convenience, a direction from the left to the right is referred to as a positive X axial direction, a direction from the back to the front is referred to as a positive Y axial direction, and a direction from up to down is referred to as a positive Z axial direction. Elements that are the same or equivalent are labeled with the same reference signs in the drawings and description thereof is not repeated.

Figure 1:
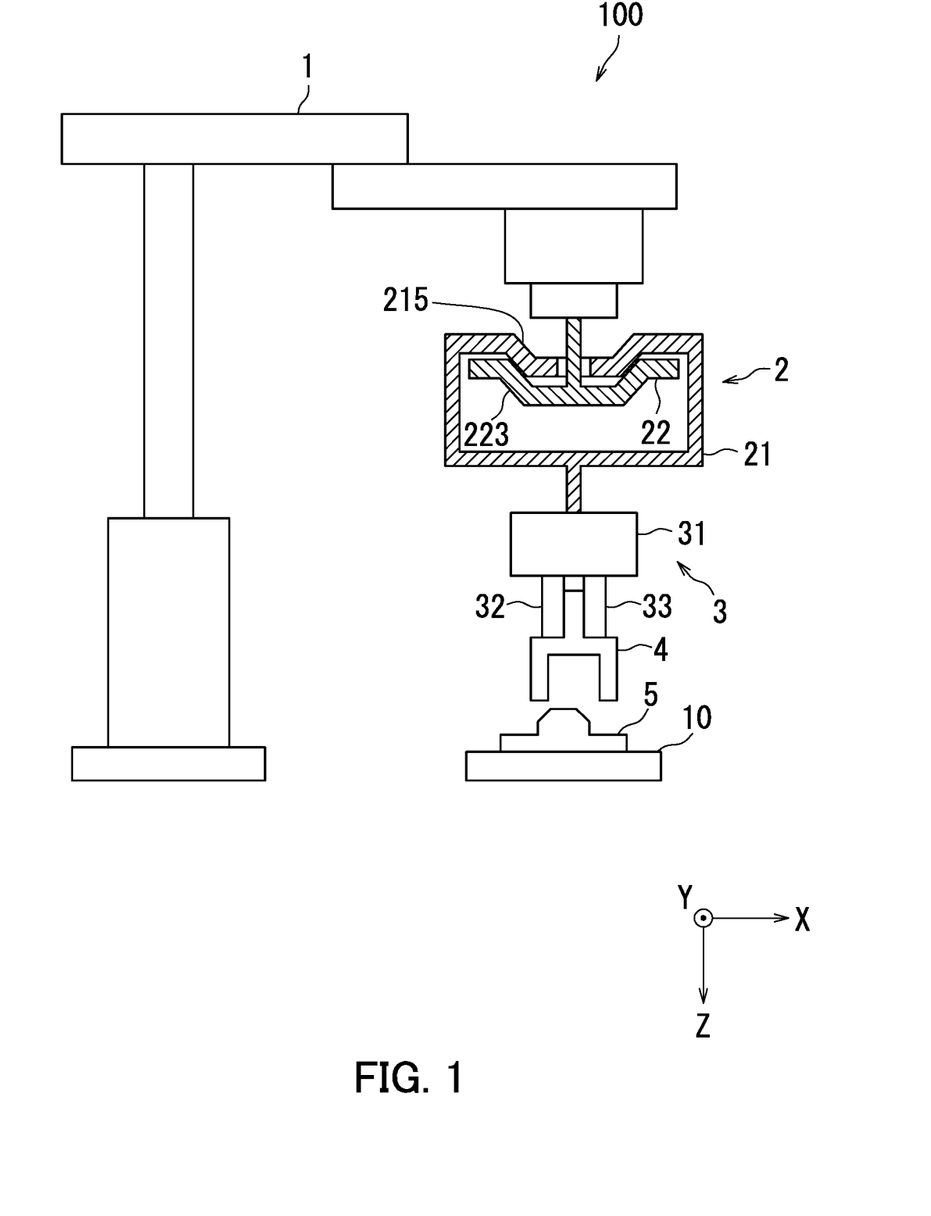
FIG. 1 is a partial cross-sectional view of an example of an assembly apparatus according to an embodiment.

First, an overall configuration of an assembly apparatus 100 according to the embodiment is described with reference to FIG. 1. FIG. 1 is a partial cross-sectional view of an example of the assembly apparatus 100 according to the embodiment.

As illustrated in FIG. 1, the assembly apparatus 100 is an apparatus which assembles a first component 4 and a second component 5. The assembly apparatus 100 includes a robot 1, a position correcting device 2, and a gripping mechanism 3.

The first component 4 has a recess, and the second component 5 has a projection. The projection of the second component 5 has a chamfered portion. The position of the second component 5 is determined on a position determining mechanism 10.

The gripping mechanism 3 grips the first component 4. The gripping mechanism 3 includes a housing 31, a first finger 32, and a second finger 33. The gripping mechanism 3 grips the first component 4 by pinching the first component 4 between the first finger 32 and the second finger 33. The gripping mechanism 3 is equivalent to an example of a "gripping section".

The position correcting device 2 corrects, relative to the second component 5, positional shift of the first component 4 gripped by the gripping mechanism 3. The position correcting device 2 includes a first mechanism 21 connected to the gripping mechanism 3 and a second mechanism 22 connected to the robot 1. The first mechanism 21 has a first tapered portion 215 on a surface opposite to the gripping mechanism 3. The second mechanism 22 has a second tapered portion 223 on a surface opposite to the robot 1. The second tapered portion 223 has a substantially identical shape to the first tapered portion 215. The first tapered portion 215 is placed on the second tapered portion 223. The position correcting device 2 is equivalent to an example of a "correcting section".

The robot 1 drives the position correcting device 2. The gripping mechanism 3 is driven by the position correcting device 2. The robot 1 is equivalent to an example of a "driving section".

Figure 2:
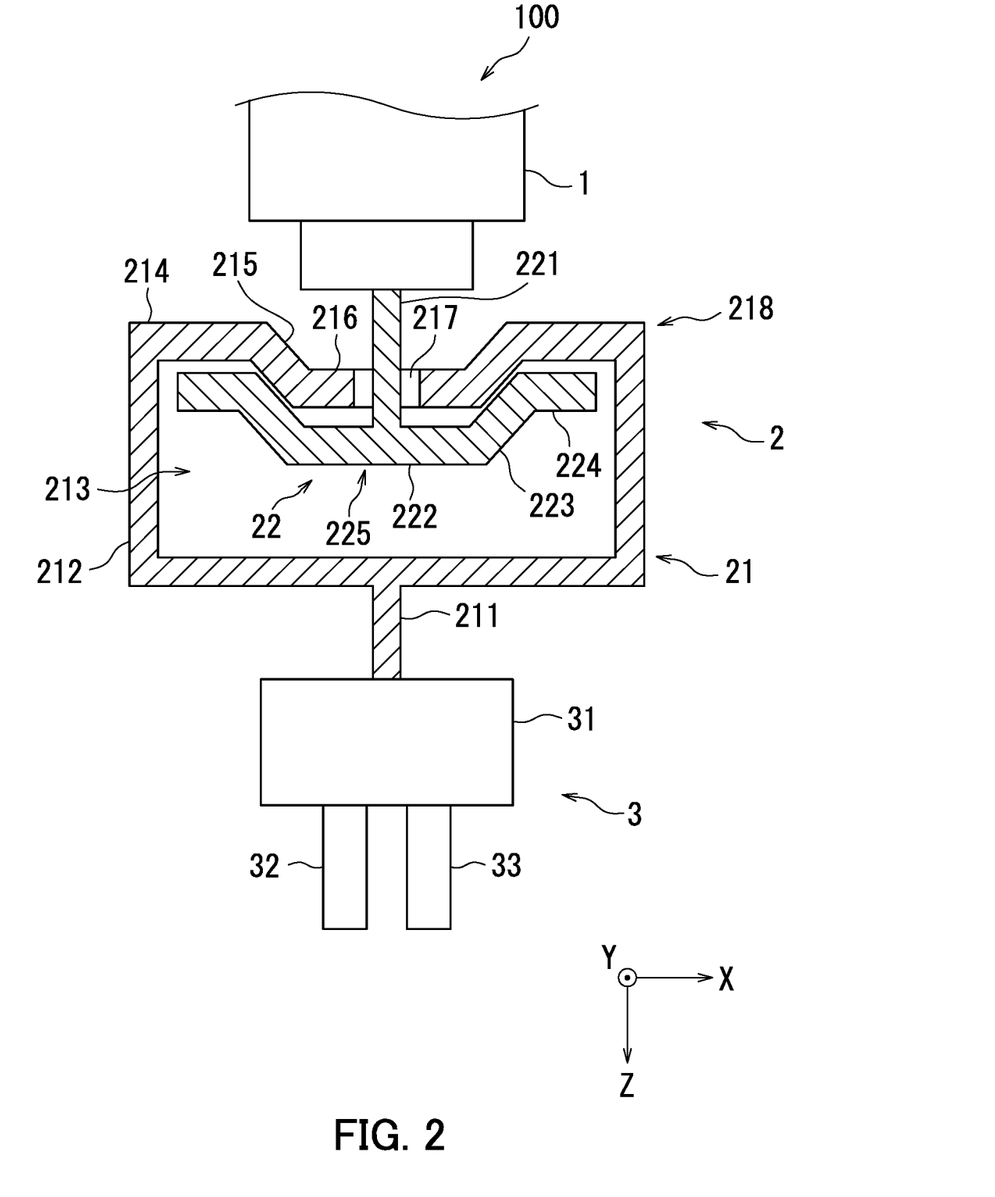
FIG. 2 is an enlarged view of the detailed structure of a position correcting device.

Next, a detailed structure of the position correcting device 2 is described with reference to FIGS. 1 and 2. FIG. 2 is an enlarged view of the detailed structure of the position correcting device 2.

As illustrated in FIG. 2, the first mechanism 21 and the second mechanism 22 each are symmetrical with respect to a center axis in the Z axial direction.

In addition to the first tapered portion 215, the first mechanism 21 includes a first connecting portion 211, a housing portion 212, a hollow portion 213, a first edge portion 214, a first disc portion 216, and a through hole 217. The housing portion 212, the first edge portion 214, the first tapered portion 215, and the first disc portion 216 constitute a box 218.

The first connecting portion 211 is on the center axis, and connects a base surface of the bottomed cylindrical housing portion 212 to the housing 31. The hollow portion 213 is a cylindrical space inside the housing portion 212. The first edge portion 214 is ring-shaped so as to form a peripheral edge portion of a lid of the housing portion 212. The first edge portion 214 is connected to the first disc portion 216 forming a central portion of the lid of the housing portion 212 through the first tapered portion 215. The first tapered portion 215 is a conical surface portion. Accordingly, a bowl-shaped recess is formed in the first mechanism 21. The through hole 217 is provided in the center of the first disc portion 216.

In addition to the second tapered portion 223, the second mechanism 22 includes a second connecting portion 221, a second disc portion 222, and a second peripheral edge portion 224. The second disc portion 222, the second tapered portion 223, and the second peripheral edge portion 224 constitute a plate 225.

The second connecting portion 221 is on the center axis and connects the center of the second disc portion 222 to the robot 1. The second connecting portion 221 passes through the through hole 217. The second disc portion 222 is connected to the ring-shaped second peripheral edge portion 224 through the second tapered portion 223. The second tapered portion 223 is a conical surface portion. Accordingly, a bowl-shaped recess is formed also in the second mechanism 22. The second disc portion 222, the second tapered portion 223, and the second peripheral edge portion 224 are housed in the box 218.

As described above, the first mechanism 21 is formed as the box 218 connected to the gripping mechanism 3. The box 218 includes the first tapered portion 215. The second mechanism 22 is formed as the plate 225 connected to the robot 1. The plate 225 is housed in the box 218 and includes the second tapered portion 223.

The box 218 also includes the through hole 217 on a side toward the robot 1. The second mechanism 22 includes the second connecting portion 221 connecting the robot 1 to the plate 225 through the through hole 217.

The following describes operation of the assembly apparatus 100 with reference to FIGS. 1 to 9. FIGS. 3 to 9 are partial cross-sectional views illustrating first to seventh processes of the assembly apparatus 100.

Figure 3:
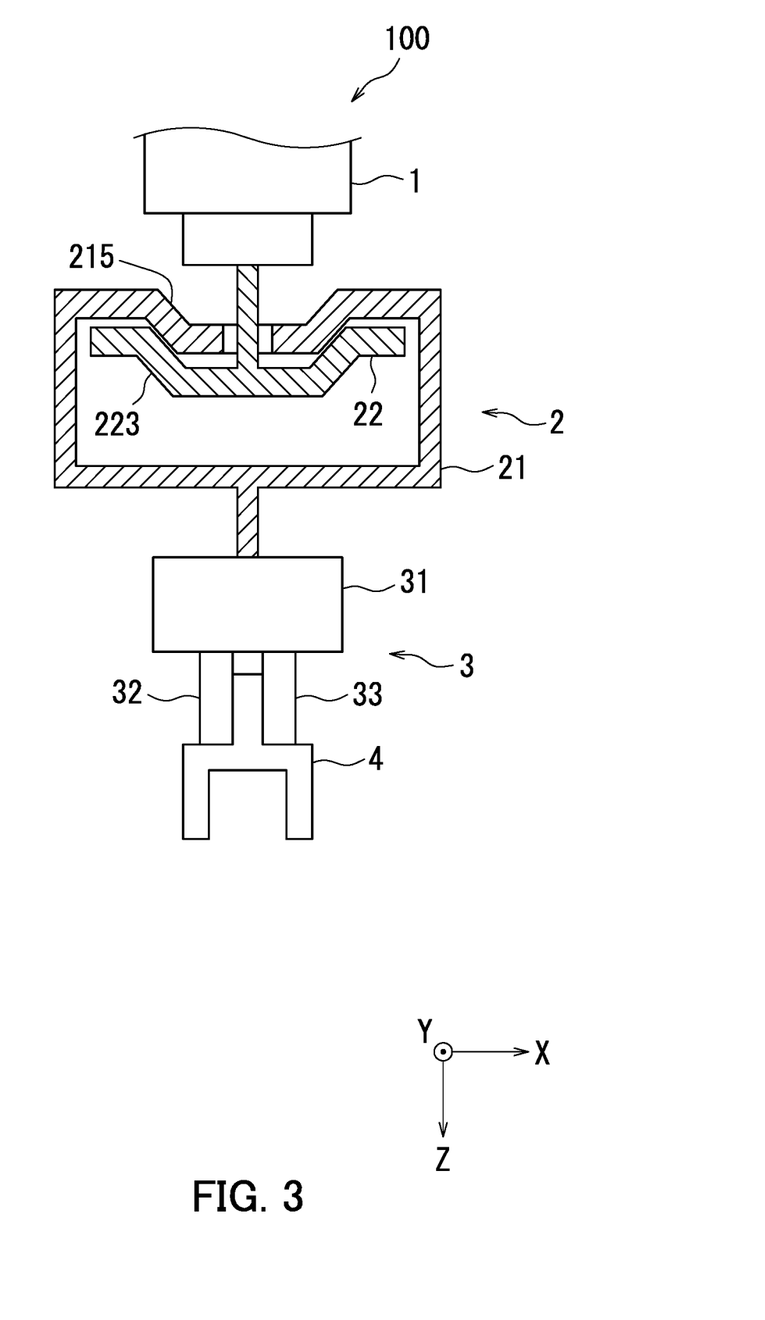
FIG. 3 is a partial cross-sectional view illustrating a first process performed by the assembly apparatus.

In the first process as illustrated in FIG. 3, the robot 1 moves the gripping mechanism 3 to a point directly above the first component 4. In the above situation, the robot 1 drives the second mechanism 22. The first tapered portion 215 is placed on the second tapered portion 223, and the bowl-shaped recess of the first mechanism 21 is engaged with the bowl-shaped recess of the second mechanism 22. As a result of the engagement, the first mechanism 21 and the gripping mechanism 3 move along with the movement of the second mechanism 22. The gripping mechanism 3 grips the first component 4 using the first finger 32 and the second finger 33. Thereafter, the robot 1 moves the second mechanism 22 in the negative Z axial direction. With the first component 4 gripped by the gripping mechanism 3, the first mechanism 21 and the gripping mechanism 3 also move in the negative Z axial direction.

Figure 4:
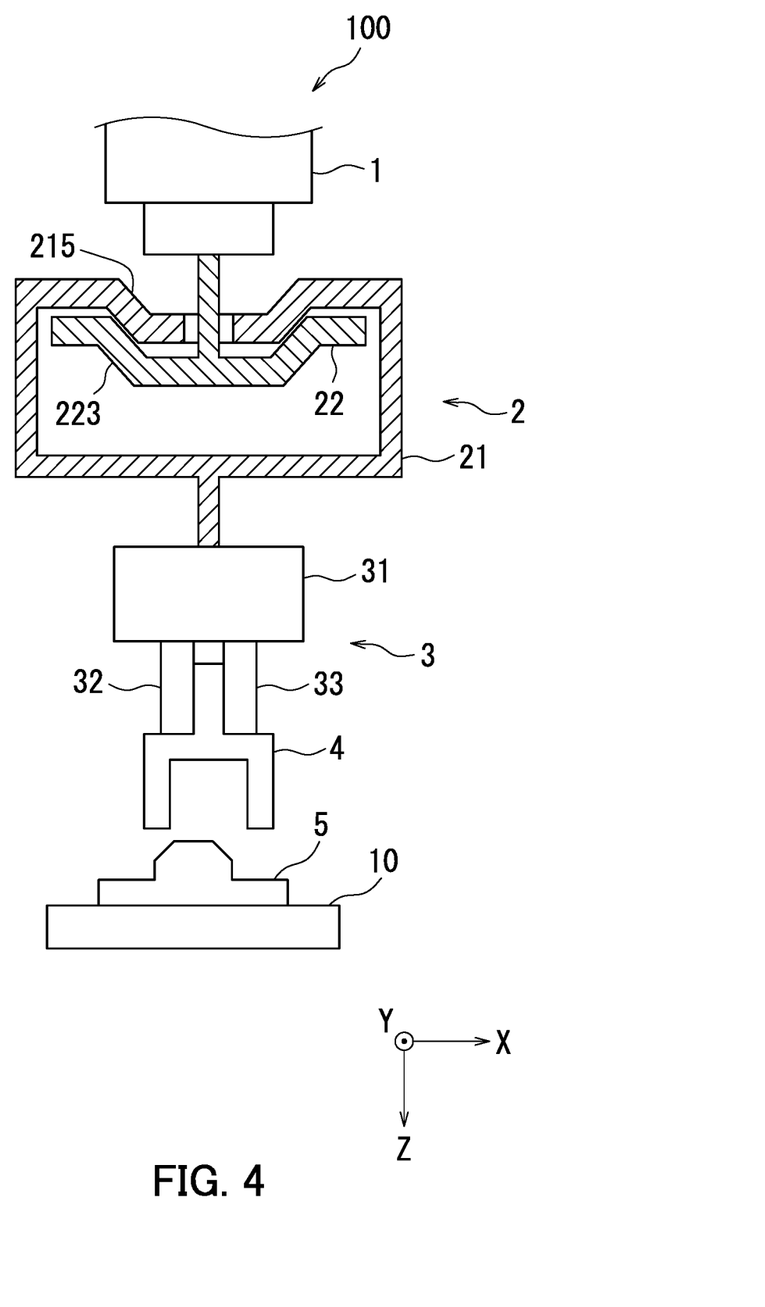
FIG. 4 is a partial cross-sectional view of a second process performed by the assembly apparatus.

In the second process as illustrated in FIG. 4, the robot 1 conveys the first component 4 to a point directly above the second component 5.

Figure 5:
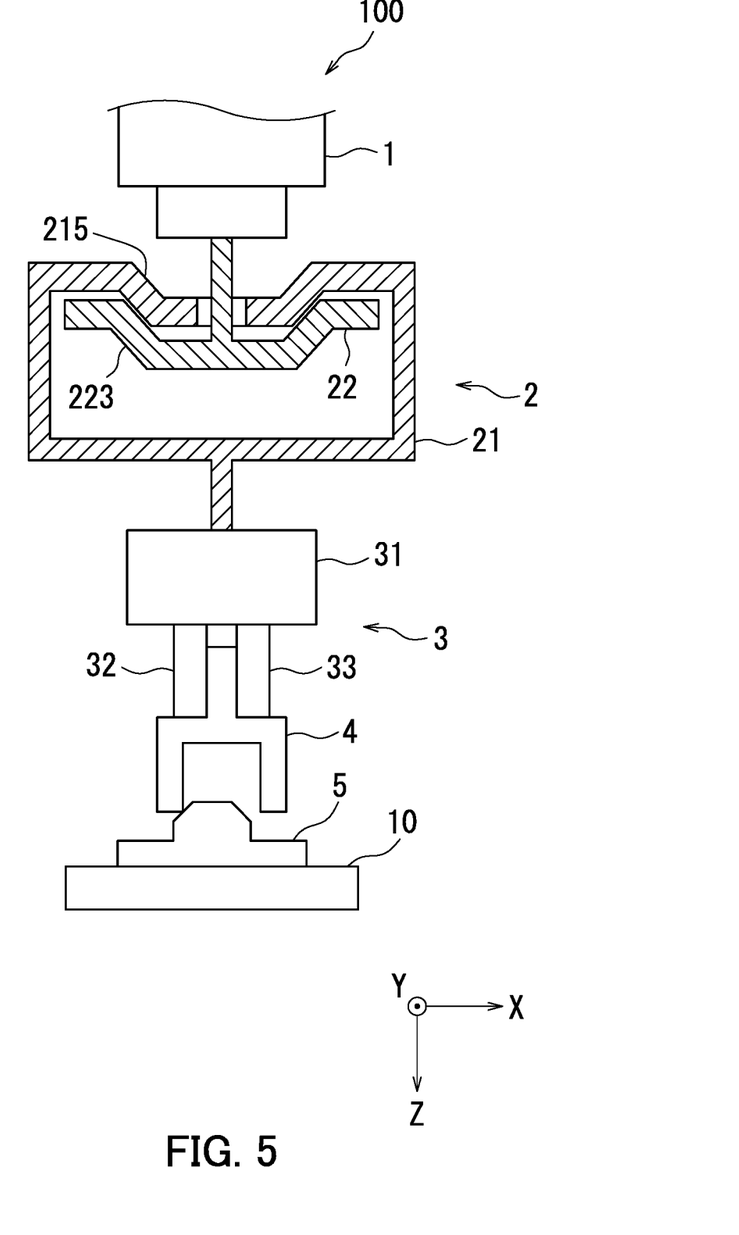
FIG. 5 is a partial cross-sectional view of a third process performed by the assembly apparatus.

In the third process as illustrated in FIG. 5, the robot 1 moves the second mechanism 22 in the positive Z axial direction. In a case where positional shift of the first component 4 occurs relative to the second component 5, the lower end of the first component 4 comes in contact with the chamfered portion of the second component 5. The first component 4 receives reaction force from the chamfered portion of the second component 5.

Figure 6:
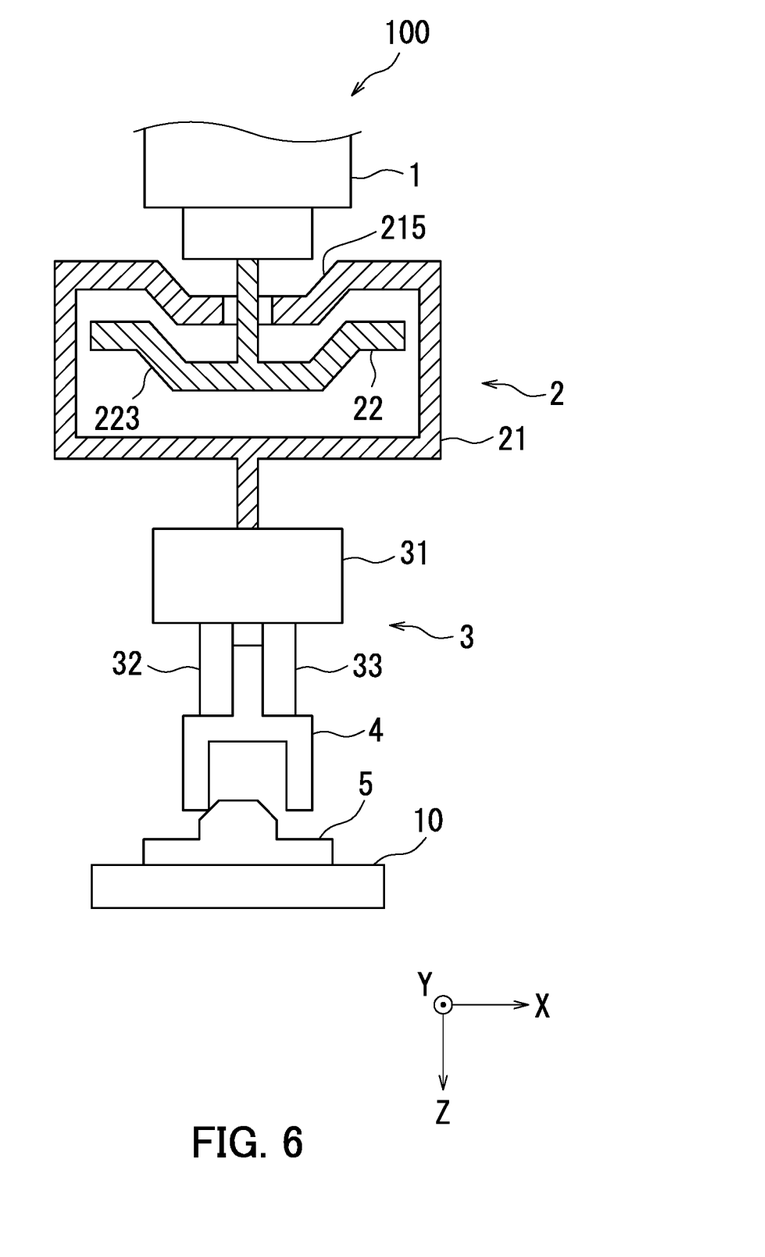
FIG. 6 is a partial cross-sectional view of a fourth process performed by the assembly apparatus.

In the fourth process as illustrated in FIG. 6, the robot 1 further moves the second mechanism 22 in the positive Z axial direction. By contrast, the first mechanism 21, the gripping mechanism 3, and the first component 4 are inhibited from moving in the positive Z axial direction by the reaction force received from the chamfered portion of the second component 5. As a result, among the first mechanism 21 and the second mechanism 22, only the second mechanism 22 moves in the positive Z axial direction inside the first mechanism 21, and the second tapered portion 223 separates from the first tapered portion 215. The engagement of the bowl-shaped recess of the first mechanism 21 with the bowl-shaped recess of the second mechanism 22 is released. The movement of the first mechanism 21 is no longer restrained by the second mechanism 22.

Figure 7:
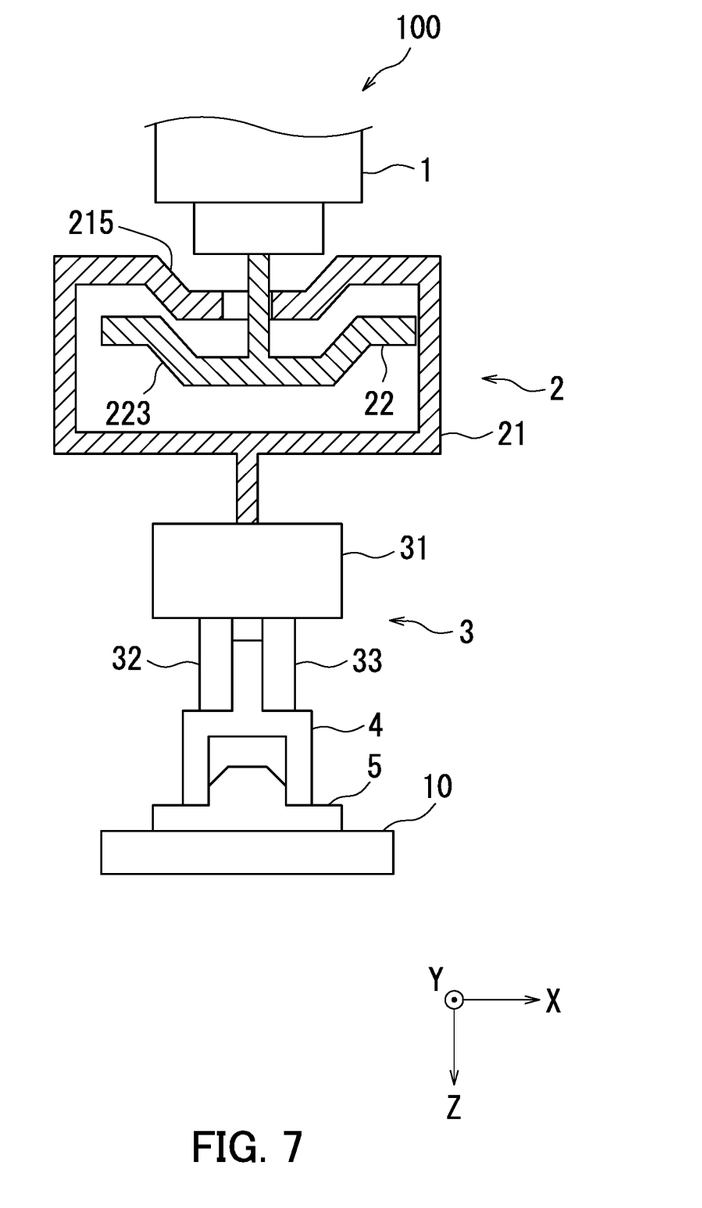
FIG. 7 is a partial cross-sectional view of a fifth process performed by the assembly apparatus.

In the fifth process as illustrated in FIG. 7, the first mechanism 21, the gripping mechanism 3, and the first component 4 slide sideways on the chamfered portion of the second component 5 while moving in the positive Z axial direction due to gravity acting thereon. As a result, positional shift of the first component 4 relative to the second component 5 is corrected and fitting of the first component 4 to the second component 5 is achieved.

Figure 8:
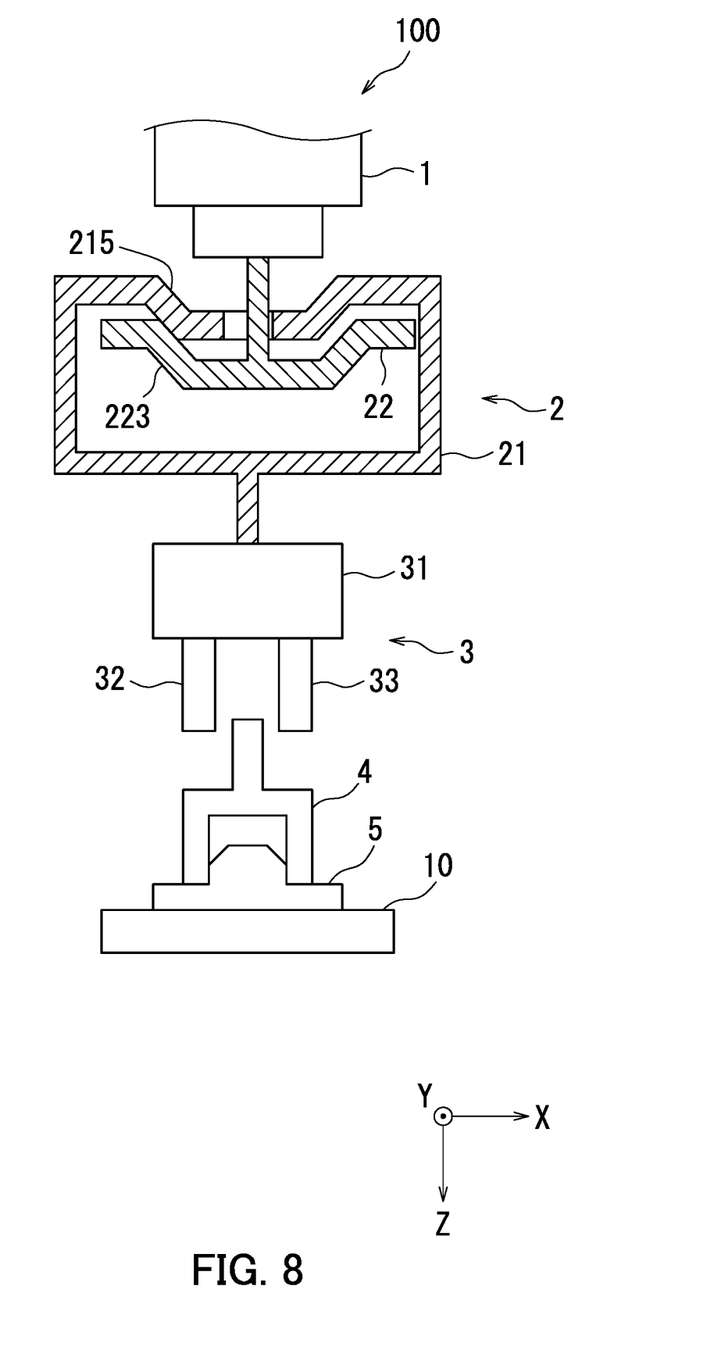
FIG. 8 is a partial cross-sectional view of a sixth process performed by the assembly apparatus.

In the sixth process as illustrated in FIG. 8, the gripping mechanism 3 releases the gripping of the first component 4 by enlarging the space between the first finger 32 and the second finger 33. The robot 1 moves the second mechanism 22 in the negative Z axial direction. As a result, in the first tapered portion 215 and the second tapered portion 223, the first mechanism 21 slides sideways relative to the second mechanism 22 and the engagement of the bowl-shaped recess of the first mechanism 21 with the bowl-shaped recess of the second mechanism 22 begins to be restored.

Figure 9:
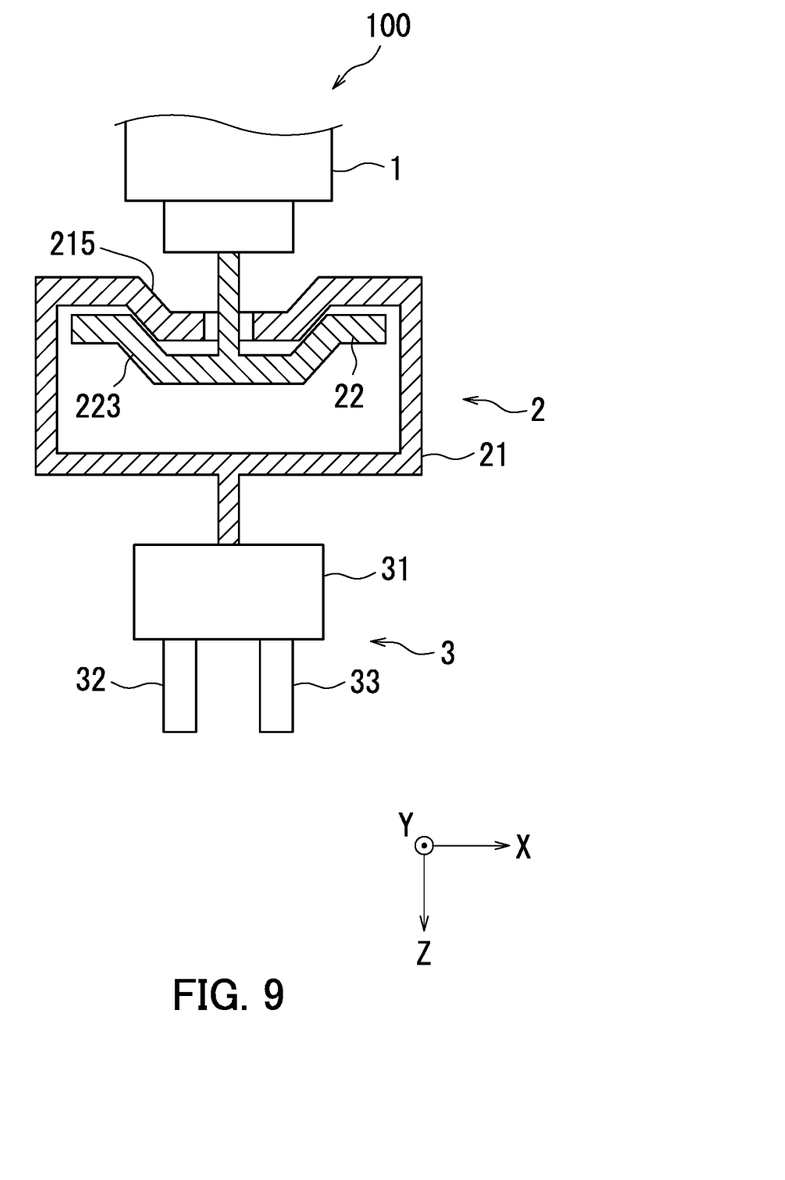
FIG. 9 is a partial cross-sectional view of a seventh process performed by the assembly apparatus.

In the seventh process as illustrated in FIG. 9, the robot 1 further moves the second mechanism 22 in the negative Z axial direction. As a result, the engagement of the bowl-shaped recess of the first mechanism 21 with the bowl-shaped recess of the second mechanism 22 is completely restored. The position correcting device 2 returns to the condition in the first process.

Figure 10:
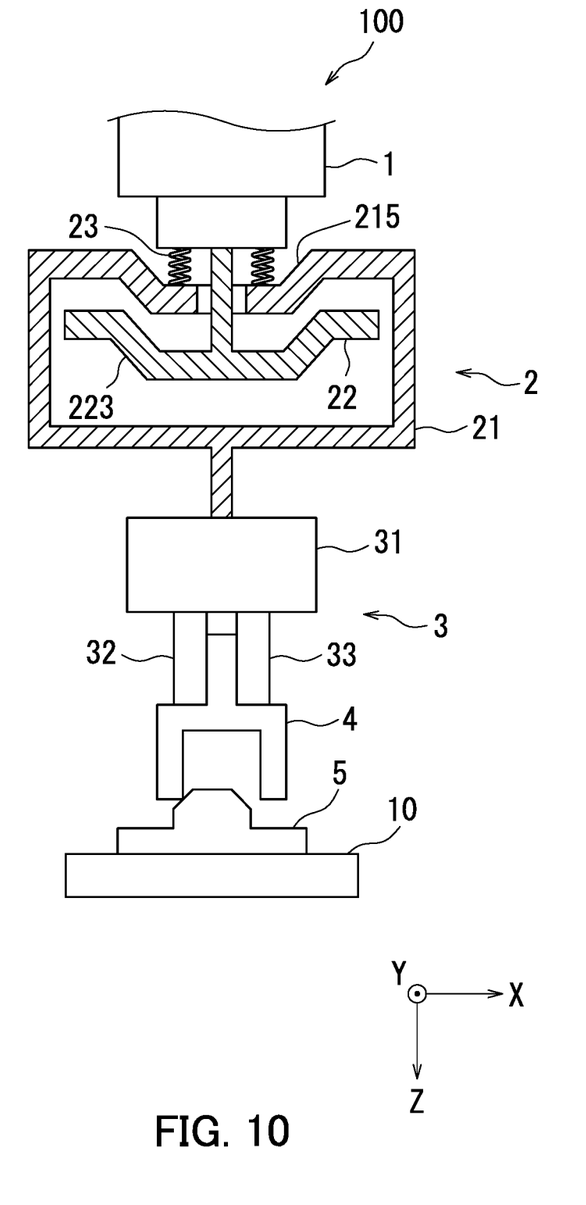
FIG. 10 is a partial cross-sectional view of a variation of the assembly apparatus.

Next, a variation of the assembly apparatus 100 is described with reference to FIG. 10. FIG. 10 is a partial cross-sectional view of a variation of the assembly apparatus 100.

The assembly apparatus 100 in FIG. 10 differs from the assembly apparatus 100 in FIG. 1 by including springs 23 between the robot 1 and the first mechanism 21. The springs 23 accumulate energy when the second mechanism 22 is driven by the robot 1 such that the second tapered portion 223 separates from the first tapered portion 215, and urges the first mechanism 21 in the direction in which the first tapered portion 215 approaches the second tapered portion 223. The springs 23 are equivalent to an example of an "elastic member".

The springs 23 assist movement of the first mechanism 21, the gripping mechanism 3, and the first component 4 during the above-mentioned fourth and fifth processes. Note that the same effect is obtained even when the springs 23 are provided between the first mechanism 21 and the second mechanism 22.

According to the embodiment examples, the assembly apparatus 100 which is difficult to damage can be provided at low cost because a sensor for detecting reaction force occurring from the chamfered portion is not necessary.

The description of the above embodiment is of a preferable embodiment of the present disclosure, and therefore includes various favorable technical limitations. However, the technical scope of the present disclosure is not limited to the embodiment unless specifically described as such. That is, elements of configuration in the above embodiment may be appropriately replaced with existing elements of configuration and the like, and a number of variations including combinations of other existing elements of configuration are possible. The description of the above embodiment does not limit the content of the disclosure described in the claims.

For example, as illustrated in FIG. 2, the first tapered portion 215 and the second tapered portion 223 are conical surface portions in the present embodiment, but are not limited as such. The first tapered portion 215 and the second tapered portion 223 may be spherical surface portions.

Furthermore, as illustrated in FIG. 2, the first mechanism 21 and the second mechanism 22 each are symmetrical with respect to the center axis and form respective bowl-shaped recesses in the first mechanism 21 and the second mechanism 22 in the present disclosure, but are not limited as such. The first mechanism 21 and the second mechanism 22 may each be symmetrical or asymmetrical relative to a plane which includes the center axis.

What is claimed is:

1. An assembly apparatus which assembles a first component and a second component, the assembly apparatus comprising:
    a gripping section configured to grip the first component;
    a correcting section configured to correct positional shift of the first component relative to the second component; and
    a driving section configured to drive the correcting section, wherein
    the correcting section includes:
        a first mechanism connected to the gripping section; and
        a second mechanism connected to the driving section,
    the first mechanism has a first tapered portion on a surface opposite to the gripping section,
    the second mechanism has a second tapered portion on a surface opposite to the driving section, the second tapered portion having a substantially identical shape to the first tapered portion,
    the first tapered portion is placed on the second tapered portion,
    the assembly apparatus further comprises an elastic member configured to accumulate energy when the second mechanism is driven by the driving section such that the second tapered portion separates from the first tapered portion, and urge the first mechanism in a direction in which the first tapered portion approaches the second tapered portion,
    the first mechanism further includes a first disc portion placed inside the first tapered portion,
    the second mechanism further includes a second disc portion placed inside the second tapered portion, and
    the elastic member urges the first disc portion in a direction in which the first tapered portion approaches the second tapered portion.

2. The assembly apparatus according to claim 1, wherein the first mechanism is a box connected to the gripping section,
    the box includes the first tapered portion,
    the second mechanism is a plate connected to the driving section, and
    the plate is housed inside the box and includes the second tapered portion.

3. The assembly apparatus according to claim 2, wherein the box has a through hole on a side toward the driving section, and
    the second mechanism further includes a connecting portion which connects the driving section to the plate through the through hole.

4. The assembly apparatus according to claim 1, wherein the first tapered portion and the second tapered portion each incline inwardly downward.

* * * * *